United States Patent
Toikkanen et al.

(10) Patent No.: US 9,347,546 B2
(45) Date of Patent: *May 24, 2016

(54) PLANET WHEEL CARRIER FOR A PLANETARY GEAR

(71) Applicant: Moventas Gears Oy, Jyväskylä (FI)

(72) Inventors: Jari Toikkanen, Muurame (FI); Jorma Tirkkonen, Jyväskylä (FI)

(73) Assignee: MOVENTAS GEARS OY, Jyväskylä (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,699

(22) Filed: Feb. 21, 2014

(65) Prior Publication Data

US 2014/0243142 A1     Aug. 28, 2014

(30) Foreign Application Priority Data

Feb. 22, 2013   (EP) ..................................... 13156296

(51) Int. Cl.
    *F16H 57/08*         (2006.01)

(52) U.S. Cl.
    CPC ..................................... *F16H 57/082* (2013.01)

(58) Field of Classification Search
    None
    See application file for complete search history.

(56) References Cited

U.S. PATENT DOCUMENTS

| | | | |
|---|---|---|---|
| 5,470,286 A | 11/1995 | Fan | |
| 2002/0091030 A1 | 7/2002 | Haga et al. | |
| 2003/0232694 A1 | 12/2003 | Buhrke | |
| 2011/0092333 A1 | 4/2011 | Murata et al. | |
| 2012/0220419 A1* | 8/2012 | Cho | 475/331 |
| 2013/0178326 A1* | 7/2013 | Franke et al. | 475/331 |
| 2014/0243143 A1* | 8/2014 | Toikkanen et al. | 475/331 |

FOREIGN PATENT DOCUMENTS

| | | |
|---|---|---|
| CN | 201090677 Y | 7/2008 |
| CN | 101469760 A | 7/2009 |
| EP | 1 371 879 A2 | 12/2003 |

(Continued)

OTHER PUBLICATIONS

English translation of the Chinese Search Report, dated Jan. 29, 2016, for Chinese Application No. 201410061328.4.

*Primary Examiner* — Justin Holmes
*Assistant Examiner* — Timothy M Hannon
(74) *Attorney, Agent, or Firm* — Birch, Stewart, Kolasch & Birch, LLP

(57) ABSTRACT

A planet wheel carrier comprises first and second end-sections for supporting shafts of planet wheels (113-114) of a planetary gear so that geometrical rotation axes of the planet wheels are pithed at substantially uniform intervals on a periphery of a circle. The planet wheel carrier comprises a support structure connected to outer rims of the first and second end-sections and located between the first and second end-sections in the axial direction and between the planet wheels in the circumferential direction. The support structure is so far from the geometrical rotational symmetry axis of a sun shaft (111) of the planetary gear and the geometrical rotation axes of the planet wheels are so near to the rotational symmetry axis of the sun shaft that the diameter (D) of the planet wheels is capable of being at least 90% of a distance (d) between the geometrical rotation axes of adjacent planet wheels.

11 Claims, 3 Drawing Sheets

(56) References Cited

FOREIGN PATENT DOCUMENTS

| | | | |
|---|---|---|---|
| EP | 2 072 858 A1 | | 6/2009 |
| JP | 2002-188693 A | | 7/2002 |
| JP | 2005-337400 A | | 12/2005 |
| JP | 2005337400 A | * | 12/2005 |
| JP | 2007-71273 A | | 3/2007 |
| WO | WO 03004908 A2 | * | 1/2003 |
| WO | WO 2011157842 A1 | * | 12/2011 |

* cited by examiner

PLANET WHEEL CARRIER FOR A PLANETARY GEAR

FIELD OF THE INVENTION

The invention relates to a planet wheel carrier for a planetary gear. Furthermore, the invention relates to a planetary gear.

BACKGROUND

A planetary gear comprises a planet wheel carrier, a sun shaft, a gear ring, and planet wheels supported by the planet wheel carrier so that the planet wheels are meshing with the sun shaft and with the gear ring. In cases where the gear ring is stationary, the gear ratio between the sun shaft and the planet wheel carrier is $D_R/D_S+1$, where $D_R$ is the diameter of the gear ring and $D_S$ is the diameter of the sun shaft. The planet wheel carrier in its simple form comprises a first end-section for supporting first ends of the shafts of the planet wheels and a second end-section for supporting the second ends of the shafts of the planet wheels. In many cases, however, a planet wheel carrier of the kind described above can be mechanically too elastic, i.e. not sufficiently stiff, and thus the positions of the planet wheels with respect to the sun shaft and to the gear ring are not necessarily as desired especially during high load conditions. This may cause excessive wear of the teeth of the planet wheels, the teeth of the sun shaft, and the teeth of the gear ring.

In order to increase the mechanical stiffness, many planet wheel carriers comprise a support structure that is between the first and second end-sections in the axial direction of the planet wheels. An inconvenience related to the support structure is that it requires room and thus the support structure limits the maximum diameter of the planet wheels especially in cases where there are four or more planer wheels. Limiting the diameter of the planet wheels sets an upper limit to the gear ratio because the diameter of the sun shaft $D_S$ cannot be smaller than:

$$D_R - 2 \times D_{Pmax},$$

where $D_{Pmax}$ is the greatest possible diameter of the planet wheels. Therefore, there is a trade-off between the mechanical stiffness of the planet wheel carrier and the maximum achievable gear ratio.

Publication JP2007071273 discloses a planet wheel carrier comprising a support structure that does not essentially limit the maximum achievable gear ratio but only if the number of planet wheels is at most three. However, in many cases, there is a need for at least four planet wheels.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the present invention, there is provided a new planet wheel carrier for a planetary gear. A planet wheel carrier according to the invention is suitable for supporting at least four planet wheels and comprises:

- a first end-section for supporting first ends of the shafts of the planet wheels of the planetary gear so that geometrical rotation axes of the planet wheels are pithed at substantially uniform intervals on a periphery of a circle,
- a second end-section for supporting the second ends of the shafts of the planet wheels, and
  - a support structure connected to the first and second end-sections and located between the first and second end-sections in an axial direction of the planet wheels and between the planet wheels in the circumferential direction of the planet wheel carrier.

The support structure is connected to outer rims of the first and second end-sections and configured to be so far from the geometrical rotational symmetry axis of a sun shaft of the planetary gear and the geometrical rotation axes of the planet wheels are configured to be so near to the geometrical rotational symmetry axis of the sun shaft that a maximum diameter of the planet wheels is capable of being at least 90%, and more advantageously at least 95%, and less than 100% of the distance between the geometrical rotation axes of adjacent ones of the planet wheels. The first end-section is attached to the support structure so that the first end-section is non-destructively detachable from the support structure, and the first end-section comprises separate sectors each of which comprises a portion for supporting at least one of the first ends of the shafts of the planet wheels and being attached to the support structure so that each of the sectors is non-destructively detachable from other ones of the sectors and from the support structure.

In the above-described planet wheel carrier, the fact that the radially outermost parts of the support structure give most of the contribution to the mechanical stiffness is utilized. In conjunction with the present invention it has been surprisingly noticed that the radially inner parts of the support structure which in planet wheel carriers according to the prior art set an upper limit to the diameter to the planet wheels can be left out without practically sacrificing the mechanical stiffness of the planet wheel carrier.

In accordance with the present invention, there is provided also a new planetary gear that comprises:
- a sun shaft,
- a gear ring,
- planet wheels, and
- a planet wheel carrier according to the invention and supporting the planet wheels so that the planet wheels are meshing with the sun shaft and with the gear ring.

A number of non-limiting and exemplifying embodiments of the invention are described in accompanied dependent claims.

Various non-limiting and exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an" throughout this document does not exclude a plurality.

BRIEF DESCRIPTION OF THE FIGURES

Exemplifying embodiments of the invention and their advantages are explained in greater detail below in the sense of examples and with reference to the accompanying drawings, in which.

DESCRIPTION OF THE EMBODIMENTS

Figures 1A, 1B:
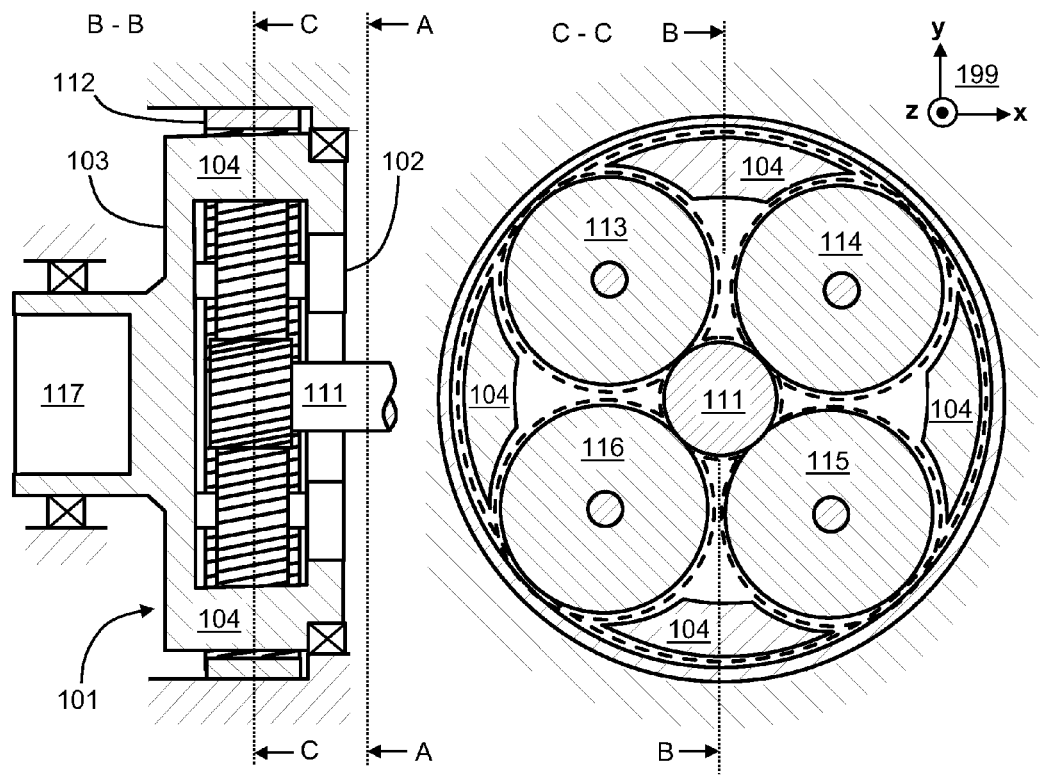
FIGS. 1a, 1b and 1c illustrate a planetary gear according to an exemplifying embodiment of the invention.
Figure 1C:
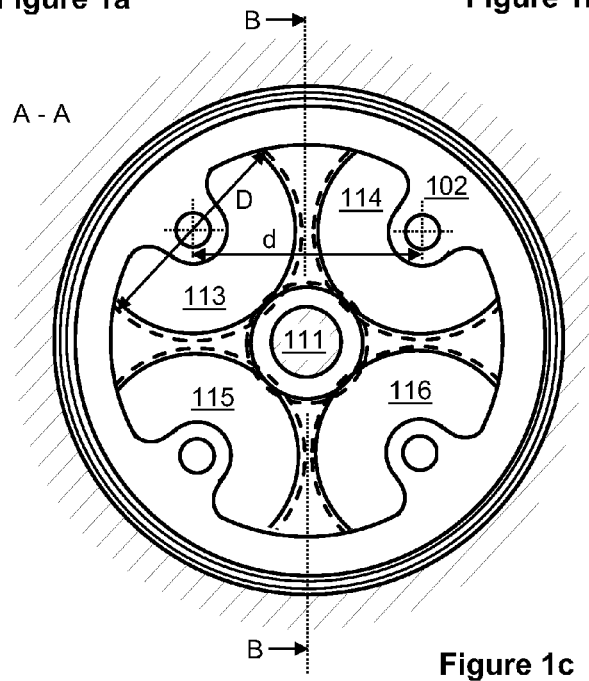

FIGS. 1a, 1b and 1c illustrate a planetary gear according to an exemplifying embodiment of the invention. FIG. 1a shows a view of a section taken along the line B-B shown in FIGS. 1b and 1c, FIG. 1b shows a view of a section taken along the line C-C shown in FIG. 1a, and FIG. 1c shows a view of a section taken along the line A-A shown in FIG. 1a. The planetary gear comprises a sun shaft 111, a gear ring 112, planet wheels 113, 114, 115 and 116, and a planet wheel carrier 101 according to an exemplifying embodiment of the invention for supporting the planet wheels so that the planet wheels are meshing with the sun shaft and with the gear ring as illustrated in FIG. 1b. The planet wheel carrier 101 comprises a connection section 117 that can be connected to an external mechanical system, for example but not necessarily, a rotor of a wind turbine. The planet wheel carrier 101 comprises a first end-section 102 for supporting first ends of the shafts of the planet wheels 113-116 so that the geometrical rotation axes of the planet wheels are pithed at substantially uniform intervals on a periphery of a circle. The planet wheel carrier 101 comprises a second end-section 103 for supporting second ends of the shafts of the planet wheels. The planet wheel carrier 101 further comprises a support structure 104 connected to the first and second end-sections 102 and 103. The support structure is located between the first and second end-sections in the axial direction of the planet wheels and between the planet wheels in the circumferential direction of the planet wheel carrier. The axial direction is the direction of the z-axis of a coordinate system 199 shown in FIG. 1b. The circumferential direction is the direction along the circumference of the gear ring 112. The support structure 104 is connected to outer rims of the first and second end-sections 102 and 103 as illustrated in FIGS. 1a and 1b. The support structure 104 is configured to be so far from the geometrical rotation axis of the sun shaft 111 and the geometrical rotation axes of the planet wheels 113-116 are configured to be so near to the geometrical rotation axis of the sun shaft that the maximum diameter D of the planet wheels is capable of being at least 90%, or more advantageously at least 95%, of the distance d between the geometrical rotation axes of adjacent ones of the planet wheels. The maximum diameter D and the distance d are illustrated in FIG. 1c. The maximum diameter D is the diameter of the smallest circle that is capable of enveloping each of the planet wheels 113-116. Thus, the teeth of the planets wheels are included in the maximum diameter D. In the above-described planet wheel carrier 101, the fact that the radially outermost parts of the support structure 104 give most of the contribution to the mechanical stiffness is utilized.

Figure 2A:
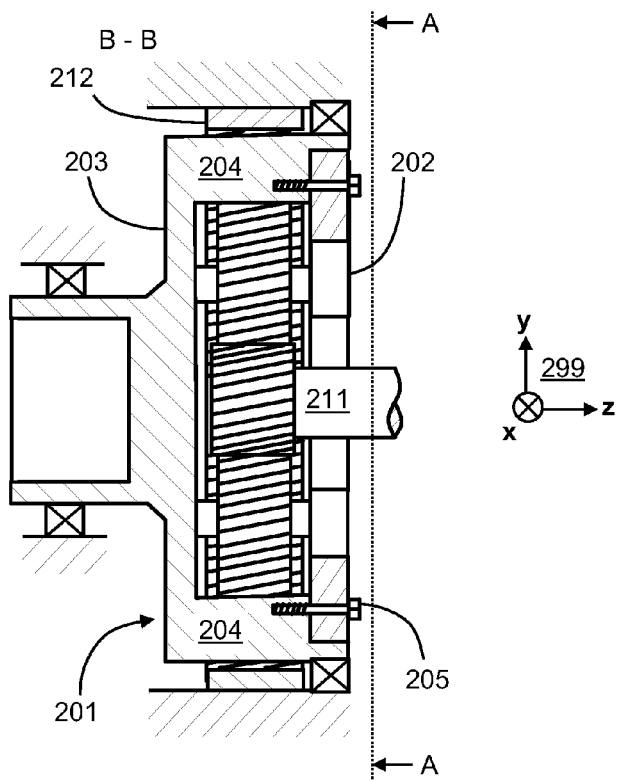
FIGS. 2a and 2b illustrate a planetary gear according to an exemplifying embodiment of the invention.
Figure 2B:
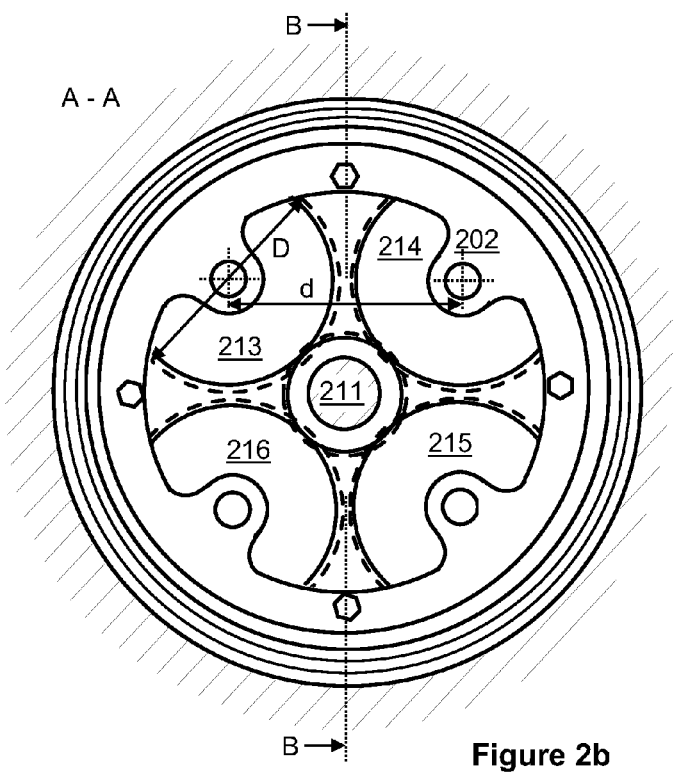

FIGS. 2a and 2b illustrate a planetary gear according to an exemplifying embodiment of the invention. FIG. 2a shows a view of a section taken along the line B-B shown in FIG. 2b, and FIG. 2b shows a view of a section taken along the line A-A shown in FIG. 2a. The planetary gear comprises a sun shaft 211, a gear ring 212, planet wheels 213, 214, 215 and 216, and a planet wheel carrier 201 according to an exemplifying embodiment of the invention for supporting the planet wheels so that the planet wheels are meshing with the sun shaft and with the gear ring. The planet wheel carrier 201 comprises a first end-section 202 for supporting first ends of the shafts of the planet wheels 213-216 so that the geometrical rotation axes of the planet wheels are pithed at substantially uniform intervals on a periphery of a circle. The planet wheel carrier 201 comprises a second end-section 203 for supporting second ends of the shafts of the planet wheels. The planet wheel carrier 201 further comprises a support structure 204 connected to the first and second end-sections 202 and 203. The support structure is located between the first and second end-sections in the axial direction of the planet wheels and between the planet wheels in a circumferential direction of the planet wheel carrier. The support structure 204 is connected to outer rims of the first and second end-sections 202 and 203 as illustrated in FIG. 2a. The support structure 204 is configured to be so far from the geometrical rotation axis of the sun shaft 211 and the geometrical rotation axes of the planet wheels 213-216 are configured to be so near to the geometrical rotation axis of the sun shaft that a maximum diameter D of the planet wheels is capable of being at least 90%, or more advantageously at least 95%, of a distance d between the geometrical rotation axes of adjacent ones of the planet wheels. The maximum diameter D and the distance d are illustrated in FIG. 2b. In the exemplifying case illustrated in FIGS. 2a and 2b, the first end-section 202 of the planet wheel carrier 201 is attached to the support structure 204 so that the first end-section 202 is non-destructively detachable from the support structure 204. In the exemplifying case illustrated in FIGS. 2a and 2b, the first end-section 202 is attached to the support structure 204 with the aid of bolts. One of the bolts is denoted with a reference number 205 in FIG. 2a. There can be, for example but not necessarily, mutually matching indentations in the support structure 204 and in the first end-section 202 so as to transfer torque between the support structure 204 and the first end-section 202. The fact that the first end-section 202 can be detached from the support structure 204 facilitates the maintenance of the planetary gear because, after removing the end-section 202, the planet wheels can be removed and installed substantially in the axial direction of the planet wheels, i.e. the planet wheels can be removed substantially in the positive z-direction of a coordinate system 299 shown in FIG. 2a and installed substantially in the negative z-direction of the coordinate system 299.

Figure 3:
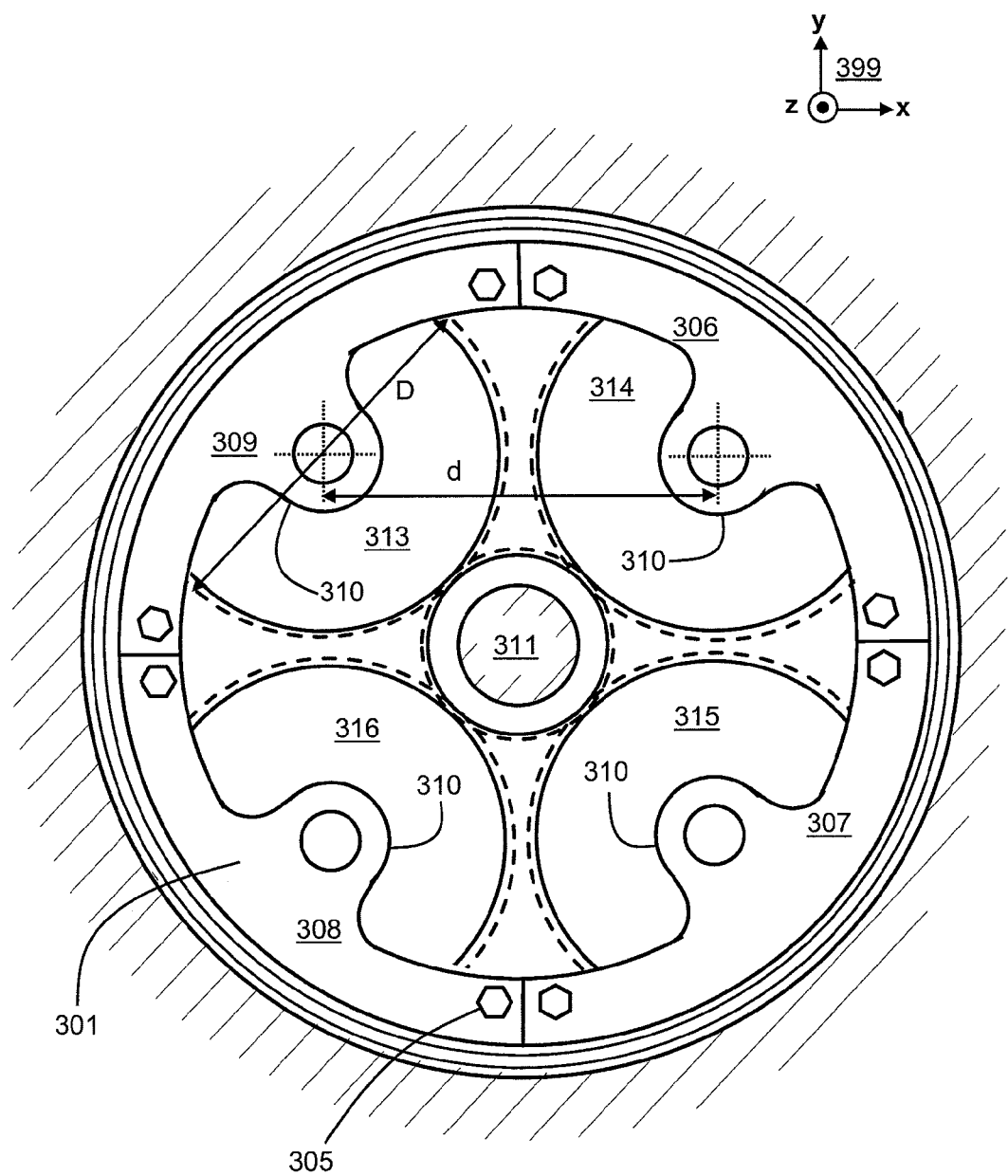
FIG. 3 illustrates a planet wheel carrier according to an exemplifying embodiment of the invention.

FIG. 3 illustrates a planet wheel carrier 301 according to an exemplifying embodiment of the invention. The planet wheel carrier comprises a first end-section for supporting first ends of the shafts of planet wheels 313, 314, 315 and 316 of a planetary gear so that the geometrical rotation axes of the planet wheels are pithed at substantially uniform intervals on a periphery of a circle. The planet wheel carrier comprises a second end-section for supporting the second ends of the shafts of the planet wheels. The second end-section is not shown in FIG. 3 but the second end-section can be according to what is illustrated in FIG. 1a. The planet wheel carrier comprises a support structure connected to the first and second end-sections and located between the first and second end-sections in the axial direction of the planet wheels and between the planet wheels in the circumferential direction of the planet wheel carrier. The support structure is not shown in FIG. 3 but the support structure can be according to what is illustrated in FIGS. 1a and 1b. In the exemplifying case illustrated in FIG. 3, the first end-section of the planet wheel carrier 301 comprises separate sectors 306, 307, 308 and 309. Each of the sectors 306-309 comprises a portion for supporting one the first ends of the shafts of the planet wheels, and each of the sectors 306-309 is attached to the support structure so that each of the sectors 306-309 is separately and non-destructively detachable from the support structure. In the exemplifying case illustrated in FIG. 3, the sectors 306-309 are attached to the support structure with the aid of bolts. One of the bolts is denoted with a reference number 305 in FIG. 3. There can be, for example but not necessarily, mutually matching indentations in the support structure and in each of the sectors 306-309 so as to transfer torque between the support structure and the sectors 306-309. The fact that each of the sectors 306-309 is separately and non-destructively detachable from the support structure facilitates the maintenance of the planetary gear because, after removing one of the sectors, the respective planet wheel can be removed and installed substantially in the axial direction of the planet wheels, i.e. the planet wheel can be removed substantially in the positive z-direction of a coordinate system 399 shown in FIG. 3 and installed substantially in the negative z-direction of the coordinate system 399. In the exemplifying case illustrated in FIG. 3, each sector supports one of the planet wheels. It is also possible that there are two sectors each supporting two of the planet wheels.

The first end-sections of the planet wheel carriers 101, 201 and 301 illustrated in FIGS. 1a-1c, 2a, 2b, and 3 are shaped to comprise cantilevers protruding towards the geometrical rotational symmetry axis of the sun shaft so that each of the cantilevers is configured to support one of the first ends of the shafts of the planet wheels. In FIG. 3, the cantilevers are denoted with a reference number 310. The purpose of the shape comprising the above-mentioned cantilevers is to maximize the open area surrounded by the first end-section so as to facilitate the maintenance of the planetary gear.

In the exemplifying planetary gears illustrated in FIGS. 1a-1c, 2a, 2b, and 3, the number of the planet wheels is four. It is, however, also possible that the number of the planet wheels is more or less than four.

In the exemplifying cases illustrated in FIGS. 1a-1c, 2a, 2b, and 3, the gear ring is stationary and the planet carrier and the sun shaft are rotatable. It is also possible that the planet carrier is stationary and the sun shaft and the gear ring are rotatable. Furthermore, it is also possible that the sun shaft is stationary and the planet wheel carrier and the gear ring are rotatable. Irrespectively whether or not the sun shaft is rotatable, the sun shaft has a geometrical rotational symmetry axis which is mentioned in the appended claims.

The specific examples provided in the description given above should not be construed as limiting the applicability and/or interpretation of the appended claims.

What is claimed is:

1. A planet wheel carrier for a planetary gear, the planet wheel carrier being suitable for supporting at least four planet wheels and comprising:
    a first end-section for supporting first ends of a plurality of shafts of planet wheels of the planetary gear so that geometrical rotation axes of the planet wheels are pithed at substantially uniform intervals on a periphery of a circle,
    a second end-section for supporting second ends of the shafts of the planet wheels, and
    a support structure connected to the first and second end-sections and located between the first and second end-sections in an axial direction of the planet wheels and between the planet wheels in a circumferential direction of the planet wheel carrier,
        wherein the support structure is connected to outer rims of the first and second end-sections and configured to be so far from a geometrical rotational symmetry axis of a sun shaft of the planetary gear and the geometrical rotation axes of the planet wheels are configured to be so near to the geometrical rotational symmetry axis of the sun shaft that a maximum diameter of the planet wheels is capable of being at least 90% and less than 100% of a distance between the geometrical rotation axes of adjacent ones of the planet wheels,
    wherein the first end-section is attached to the support structure so that the first end-section is non-destructively detachable from the support structure, and
    the first end-section comprises separate sectors each of which comprises a portion for supporting at least one of the first ends of the shafts of the planet wheels and being attached to the support structure so that each of the sectors is non-destructively detachable from other ones of the sectors and from the support structure.

2. A planet wheel carrier according to claim 1, wherein the support structure is configured to be so far from the geometrical rotational symmetry axis of the sun shaft and the geometrical rotation axes of the planet wheels are configured to be so near to the geometrical rotational symmetry axis of the sun shaft that the maximum diameter of the planet wheels is capable of being at least 95% of the distance between the geometrical rotation axes of adjacent ones of the planet wheels.

3. A planet wheel carrier according to claim 2, wherein the first end-section is shaped to comprise cantilevers protruding towards the geometrical rotational symmetry axis of the sun shaft so that each of the cantilevers is configured to support one and only one of the first ends of the shafts of the planet wheels.

4. A planet wheel carrier according to claim 1, wherein the first end-section comprises separate sectors each of which comprising a portion for supporting at least one of the first ends of the shafts of the planet wheels and being attached to the support structure so that each of the sectors is non-destructively detachable from the support structure.

5. A planet wheel carrier according to claim 4, wherein each of the sectors of the first end-section is configured to support one and only one of the first ends of the shafts of the planet wheels.

6. A planet wheel carrier according to claim 5, wherein the first end-section is shaped to comprise cantilevers protruding towards the geometrical rotational symmetry axis of the sun shaft so that each of the cantilevers is configured to support one and only one of the first ends of the shafts of the planet wheels.

7. A planet wheel carrier according to claim 4, wherein the first end-section is shaped to comprise cantilevers protruding towards the geometrical rotational symmetry axis of the sun shaft so that each of the cantilevers is configured to support one and only one of the first ends of the shafts of the planet wheels.

8. A planet wheel carrier according to claim 1, wherein each of the sectors of the first end-section is configured to support one and only one of the first ends of the shafts of the planet wheels.

9. A planet wheel carrier according to claim 8, wherein the first end-section is shaped to comprise cantilevers protruding towards the geometrical rotational symmetry axis of the sun shaft so that each of the cantilevers is configured to support one and only one of the first ends of the shafts of the planet wheels.

10. A planet wheel carrier according to claim 1, wherein the first end-section is shaped to comprise cantilevers protruding towards the geometrical rotational symmetry axis of the sun shaft so that each of the cantilevers is configured to support one and only one of the first ends of the shafts of the planet wheels.

11. A planetary gear comprising: a sun shaft, a gear ring, at least four planet wheels, and a planet wheel carrier supporting the at least four planet wheels so that the planet wheels are meshing with the sun shaft and with the gear ring, the planet wheel carrier comprising:
- a first end-section supporting first ends of a plurality of shafts of the planet wheels so that geometrical rotation axes of the planet wheels are pithed at substantially uniform intervals on a periphery of a circle,
- a second end-section for supporting second ends of the shafts of the planet wheels, and
- a support structure connected to the first and second end-sections and located between the first and second end-sections in an axial direction of the planet wheels and between the planet wheels in a circumferential direction of the planet wheel carrier,
- wherein the support structure is connected to outer rims of the first and second end-sections and is so far from a geometrical rotational symmetry axis of a sun shaft of the planetary gear and the geometrical rotation axes of the planet wheels are so near to the geometrical rotational symmetry axis of the sun shaft that a maximum diameter of the planet wheels is capable of being at least 90% and less than 100% of a distance between the geometrical rotation axes of adjacent ones of the planet wheels,
- wherein the first end-section is attached to the support structure so that the first end-section is non-destructively detachable from the support structure, and
- the first end-section comprises separate sectors each of which comprises a portion for supporting at least one of the first ends of the shafts of the planet wheels and being attached to the support structure so that each of the sectors is non-destructively detachable from other ones of the sectors and from the support structure.

* * * * *